(12) United States Patent
Kim

(10) Patent No.: US 6,483,482 B1
(45) Date of Patent: Nov. 19, 2002

(54) MULTI-DISPLAY DEVICE

(75) Inventor: Si-Han Kim, Kyonggi-do (KR)

(73) Assignee: Samsung SDI Co., Ltd., Youngin (KR)

( * ) Notice: Subject to any disclaimer, the term of this patent is extended or adjusted under 35 U.S.C. 154(b) by 0 days.

(21) Appl. No.: 09/580,741

(22) Filed: May 26, 2000

(30) Foreign Application Priority Data

May 13, 1999 (KR) .............................. 99-19713
May 13, 1999 (KR) .............................. 99-19714
Feb. 22, 2000 (KR) ............................ 2000-8401

(51) Int. Cl.$^7$ .............................................. G09G 5/00
(52) U.S. Cl. ..................... 345/3.1; 345/1.1; 345/1.3; 345/903; 348/383; 359/450; 353/69; 353/70
(58) Field of Search ........................... 345/1.1, 1.3, 3.1, 345/903, 4–9; 348/335, 360, 383, 839, 840; 359/450; 353/69, 70, 74, 75, 96

(56) References Cited

U.S. PATENT DOCUMENTS

| | | | | |
|---|---|---|---|---|
| 3,909,525 A | * | 9/1975 | Fagan .......................... | 345/1.3 |
| 4,635,105 A | * | 1/1987 | Favreau .................. | 313/477 R |
| 4,695,135 A | * | 9/1987 | Blokland et al. ............. | 345/2.3 |
| 4,734,779 A | * | 3/1988 | Levis et al. .................. | 345/1.3 |
| 4,866,530 A | * | 9/1989 | Kalua .......................... | 345/1.3 |
| 4,924,318 A | * | 5/1990 | Ho .............................. | 348/383 |
| 5,523,769 A | * | 6/1996 | Lauer et al. .................. | 345/1.3 |
| 5,767,837 A | * | 6/1998 | Hara ............................ | 345/22 |
| 5,805,117 A | * | 9/1998 | Mazurek et al. ............. | 248/919 |
| 5,828,410 A | * | 10/1998 | Drapeau ...................... | 348/359 |
| 5,903,328 A | * | 5/1999 | Greene et al. ........... | 156/304.1 |
| 5,926,153 A | * | 7/1999 | Ohishi et al. ................ | 345/1.1 |
| 6,177,912 B1 | * | 1/2001 | Izumi ......................... | 345/1.3 |

FOREIGN PATENT DOCUMENTS

| | | | |
|---|---|---|---|
| JP | 01158421 A | * | 6/1989 |
| JP | 7-177451 | | 7/1995 |
| KR | 1998-17594 | | 6/1998 |

OTHER PUBLICATIONS

Greene et al, "Seamless Tiling Technology for Direct–View Color AMLCD's", SID 00 Digest, pp 461–463.*

Preas et al, "A Large–Area Tiled Gyricon Display", SID 98 Digest, pp 211–214.*

Official Action (with English translation) issued by Korean Industrial Property Office on Nov. 6, 2002 in corresponding Korean Application No. 00–4801.*

Korean Patent Office Action (Notice to Submit Response), dated May 18, 2001 with English translation.

* cited by examiner

Primary Examiner—Richard Hjerpe
Assistant Examiner—Henry N. Tran
(74) Attorney, Agent, or Firm—Robert E. Bushnell, Esq.

(57) ABSTRACT

A multi-display device includes at least two flat display panels foldably joined to each other with a border defined therebetween, and a light compensating member for directing light radiated from the panels toward an imaginary plane, extending from a center line of the border of the flat display panels, at a predetermined angle so that the border can be visually compensated.

20 Claims, 7 Drawing Sheets

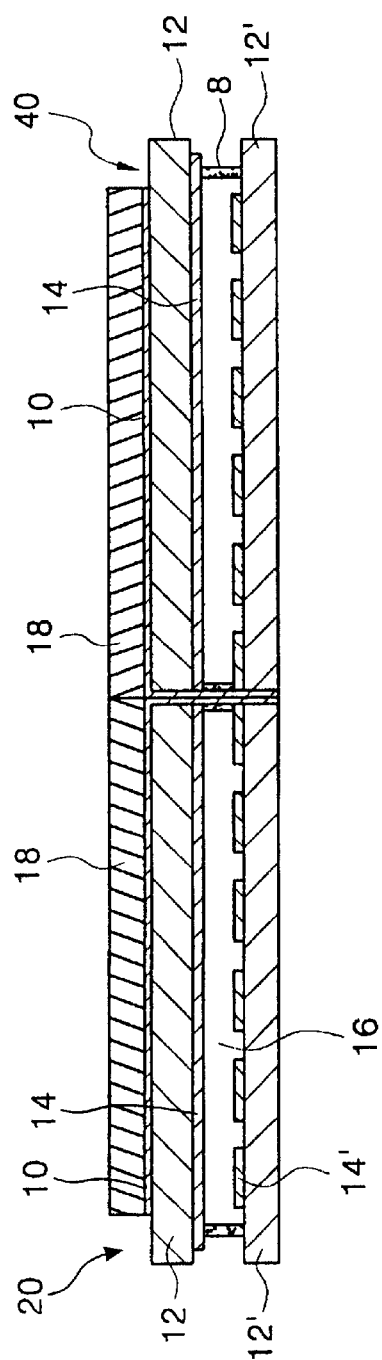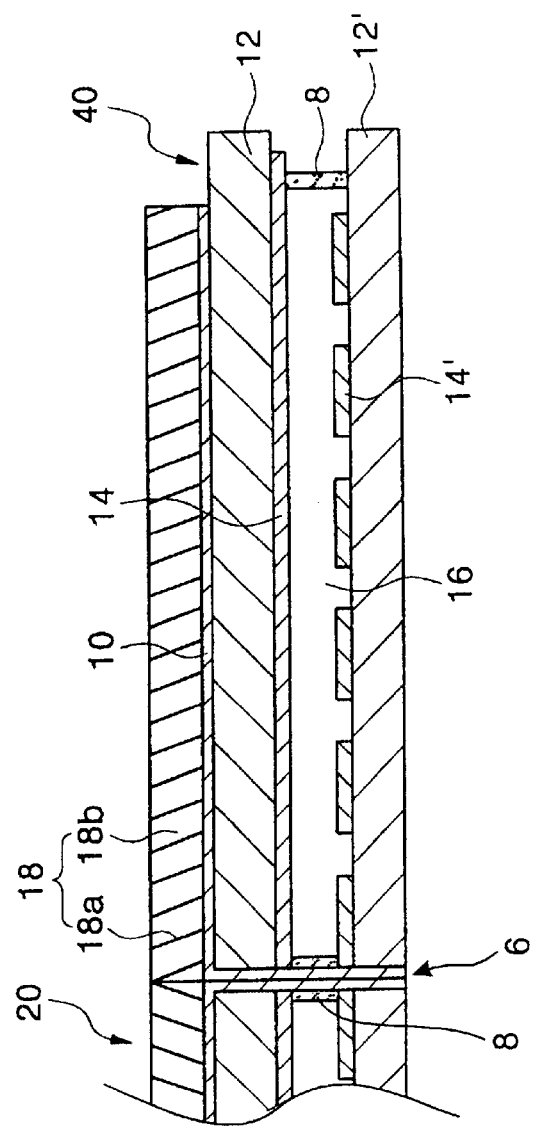
Fig. 1
Fig. 2

MULTI-DISPLAY DEVICE

BACKGROUND OF THE INVENTION

1. Field of the Invention

The present invention relates to a multi-display device having at least two flat display panels joined to one another and, more particularly, to a multi-display device having an improved display quality by visually compensating for a border defined between the joined flat display panels.

2. Description of the Related Art

A liquid crystal display (LCD), a field emission display (FED), a plasma display panel (PDP), and an electro luminescent display (EL) are well known exemplars of flat display devices.

In recent years, such flat display devices have been widely employed for a computer monitor and a wall-mounted television, as they are lightweight and thin in profile, in addition to being flat.

A common trend is to enlarge the size of the flat display to enhance use as a multi-media display. To enlarge a screen of a unit of display panel however, difficult and complicated technology is required; this increases manufacturing time and costs.

To solve the above problems, a foldable flat display device has been developed to reduce the size of the device.

As shown in FIG. 12, a conventional foldable flat display device is generally comprised of two display panels 2 and 4 pivotally joined to each other. However, in the conventional foldable flat display, because of a border 6 defined between adjacent sides of the panels 2 and 4, a user is able to see a clear separation between the panels 2 and 4.

That is, protecting films 10 are attached on the respective display panels 2 and 4. When considering that each of the protecting films 10 has a thickness of about 0.1 mm, a thickness of a sealant 8 is about 0.1 mm, and a gap G defined between adjacent sides of the panels 2 and 4 is about 0.1 mm, the whole width of the border 6 between actual display parts of the panels 2 and 4 becomes at least 0.5 mm. Therefore, the wide border 6 causes deterioration in the display quality of the device.

SUMMARY OF THE INVENTION

Therefore, the present invention has been made in an effort to solve the above described problems.

It is an objective of the present invention to provide a multi-display device having at least two display panels foldably joined to each other, in which a border defined between actual display screens of the display panels is visually compensated for so that the user cannot see any separation between the two panels, thereby improving display quality.

To achieve the above objective, the present invention provides a multi-display device comprising at least two flat display panels foldably joined to each other with a border defined therebetween, and light compensating means for directing light radiated from the panels toward an imaginary plane extending from a center line of the border of the flat display panels.

Each of the flat display panels is selected from the group of a liquid crystal display (LCD), a field emission display (FED), a plasma display panel (PDP), and an electro luminescent display (EL).

The multi-display device may further comprise a protecting film attached on screen surfaces and adjacent side walls of the flat display panels.

According to a first embodiment of the present invention, the light compensating means comprises a plurality of inclined films disposed on the flat display panels and inclined toward the imaginary plane at a predetermined angle with respect to the screen surface of the flat display panels and a transparent member disposed between the inclined films.

The predetermined angle of the inclined films is gradually increased as the inclined films are distanced from the border. The inclined films are made of metal or resin, and the transparent member is made of resin.

According to a second embodiment of the present invention, the light compensating means comprises compensating lenses each disposed on the screen surfaces of the flat display panels such that each of the compensating lenses can cover the border and at least a row of pixels which is adjacent to the border.

A length L1 of a portion covered by the compensating lenses is set according to a following formula, $$L1=L2/M$$

where L2 is a length of each pixel which is not covered by the compensating lenses and M is a magnifying force of the compensating lens.

The multi-display device may further comprise transparent layers deposited on a portion of the screen surfaces of the flat display panels, which is not covered by the compensating lenses.

In the above embodiments, the multi-display device may further comprise a diffuser disposed on the light compensating means.

Alternatively, one of adjacent walls of the flat display panels may be designed to be inclined at an angle of 1°–30° with respect to a plane vertical to the screen surface.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 1 is a sectional view of a multi-display device according to a first embodiment of the present invention;

FIG. 2 is an enlarged sectional view of one of panels depicted in FIG. 1;

DETAILED DESCRIPTION OF PREFERRED EMBODIMENTS

Figure 3:
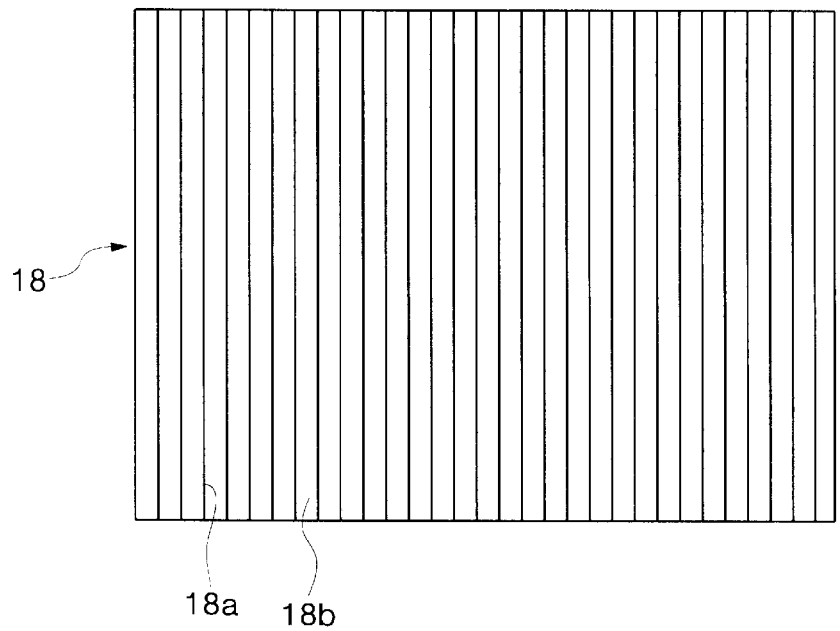
FIGS. 3 and 4 are plane views illustrating examples of light compensating means according to a preferred embodiment of the present invention.

Reference will now be made in detail to the present preferred embodiment of the invention, an example of which is illustrated in the accompanying drawing(s). Wherever possible, the same reference numbers will be used throughout the drawings to refer to the same or like parts.

In the following embodiments, as a flat display device, an LCD panel is employed. However, it should be noted that the present invention is not limited to the LCD panel.

FIGS. 1 and 2 show a multi-display device according to a preferred embodiment of the present invention.

As shown in the drawings, a multi-display device of this embodiment comprises two flat display panels 20 and 40. The flat display panels 20 and 40 are foldably joined to each other by a variety of joining means.

As the flat display panels 20 and 40 are LCD panels, each of them comprises front and rear substrates 12 and 12', ITO electrodes 14 and 14' respectively disposed on an inner surface of the substrates 12 and 12', liquid crystal material disposed within a space between the substrates 12 and 12', and a sealant 8 sealing the space.

A protecting film 10 is attached on the front substrate 12 and adjacent side walls of the flat display panels 20 and 40.

The multi-display device further comprises light compensating members 18 disposed on respective front surfaces of the flat display panels 20 and 40. The light compensating members 18 are designed to direct image light radiated from the panels toward an imaginary plane extending from a center line of a border 6 between the display panels 20 and 40 so that the user cannot see the border 6 of the panels 20 and 40.

Each of the light compensating members 18 comprises a plurality of inclined films 18a disposed on the panels 20 and 40 and inclined toward the imaginary plane at a predetermined angle, and a transparent member 18b disposed between the inclined films 18a (see FIG. 2).

Preferably, the inclined films 18a are made of metal or resin such as acryl and polycarbonate, and the transparent member 18b is made of transparent resin.

Figure 4:
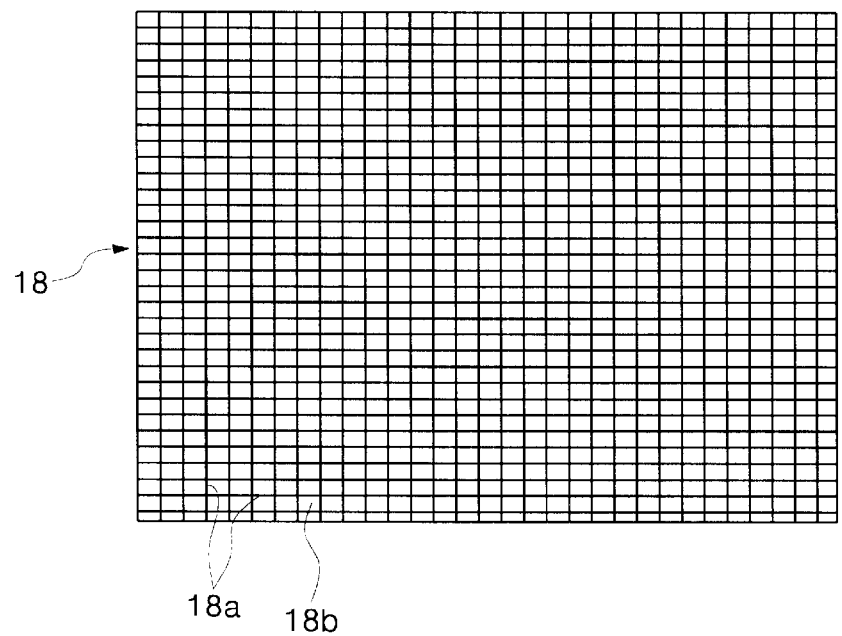

To make the light compensating members 18, the inclined films 18a are first disposed within a mold at a predetermined angle, then transparent material is injected into the mold and hardened to form the transparent member 18b between the inclined films 18a. The inclined films 18a may be a stripe type (see FIG. 3) or a grid type (see FIG. 4).

Figure 5:
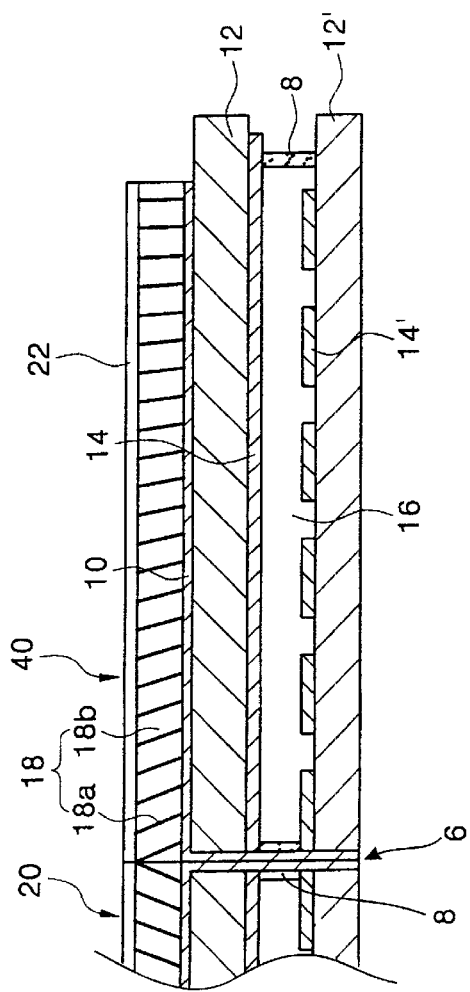
FIG. 5 is a sectional view of a modified example of the first embodiment.

In addition, as shown in FIG. 5, inclined angles of the inclined films 18a with respect to screen surfaces of the flat display panels 20 and 40 may be gradually increased as they are distanced from the border 6. That is, the farther from the border 6, the greater the inclined angles of the inclined films 18a.

At this point, the inclined films 18a are inclined toward the border 6 at an angle of about 70°–90° with respect to the screen surfaces of the flat display panels 20 and 40. That is, the inclined angle of the inclined films 18a closest to the border 6 is about 70°, and the inclined films 18a farthest from the border 6 is about 90°.

Since the stripe or grid type inclined films 18a may cause the deterioration of the display quality, the device of this embodiment may further comprise diffusers 22 disposed on the respective light compensating members 18. The diffusers 22 diffuse the image light radiated from the flat display panels 20 and 40 and enlarge the viewing angle, improving the display quality.

Figure 6:
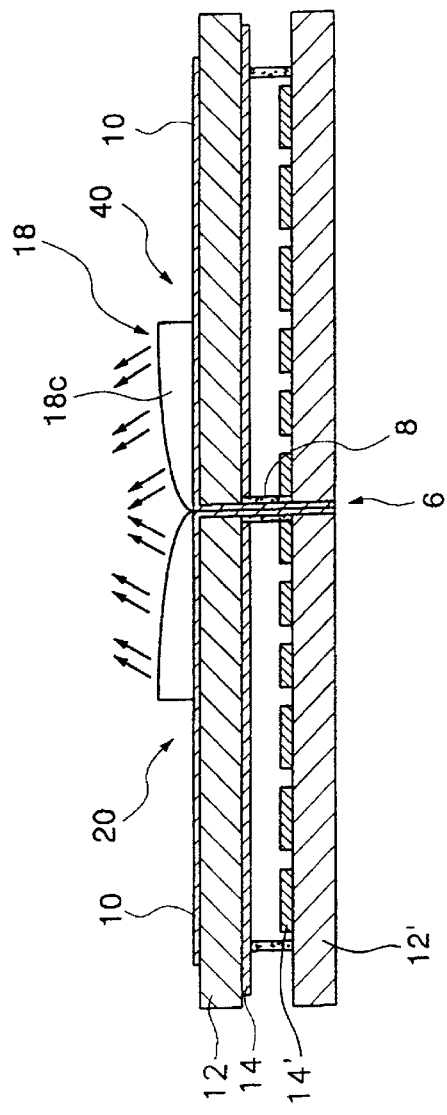
FIG. 6 is a sectional view of a multi-display device according to a second embodiment of the present invention.
Figure 7:
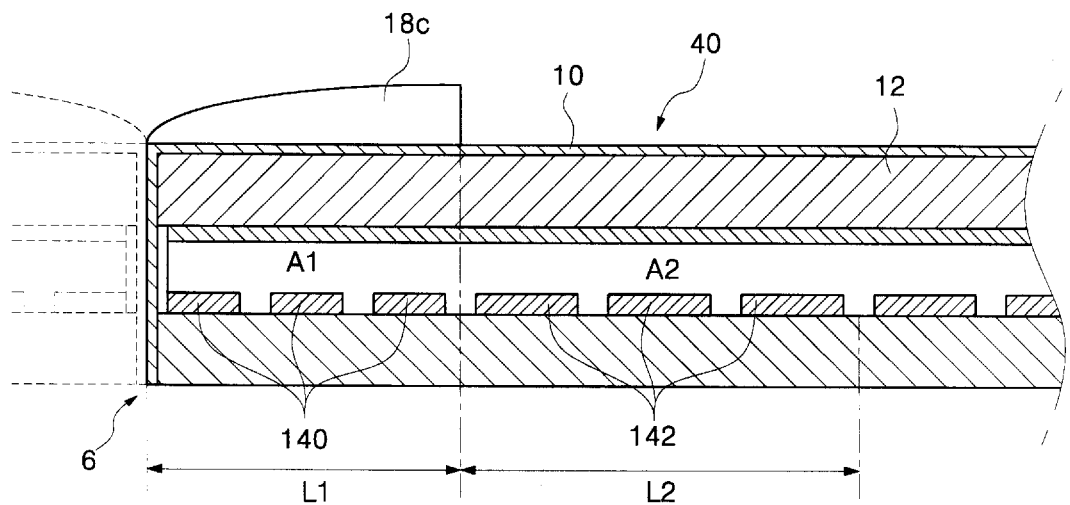
FIG. 7 is an enlarged sectional view of one of panels depicted in FIG. 6.
Figure 8:
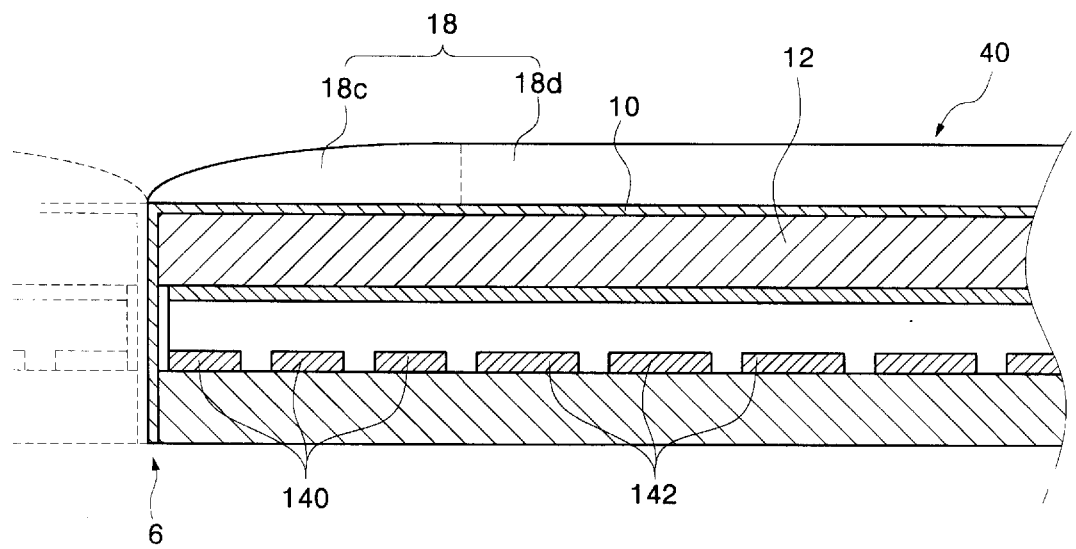
FIG. 8 is a sectional view of a modified example of the second embodiment.

FIGS. 6, 7 and 8 show a multi-display device according to a second embodiment of the present invention. The multi-display device of this embodiment is substantially identical to that of the first embodiment except for a structure of the light compensating members 18.

In this embodiment, light compensating lenses 18c are used as the light compensating members 18 to magnify the image light radiated from the flat display panels 20 and 40 and direct the same light to the imaginary plane extending from a center line of the border 6, thereby visually compensating for the separation of the border 6.

The light compensating lenses 18c are disposed on the respective flat display panels 20 and 40 such that they can cover at least a row of pixels in the vicinity of the border 6 of each of flat display panels 20 and 40. If the flat display panel is a color LCD, each of the pixels is composed of red (R), green (G), and blue (B) elements 140 (see FIG. 7).

At this point, since the row of the pixels covered by the light compensating lens 18c is magnified as much as the magnifying power, a length L1 of a portion covered by the light compensating lenses 18c should be reduced to be smaller than those which are not covered by the light compensating lens 18c.

The length L1 of the portion covered by the light compensating lens 18c can be calculated according to the following formula:

$$L1 = L2/M$$

where L2 is a length of each pixel which is not covered by the light compensating lens 18c and M is a magnifying force of the light compensating lens 18c.

Therefore, when displaying an image, the separation caused by the border 6 between the flat display panels 20 and 40 can be minimized by adjusting a magnifying force and a reflective index of the compensating lenses 18c.

A different nature may exist between the areas A1 and A2 because of the compensating lenses 18c covering the area A1. To prevent this, as shown in FIG. 8, a transparent layer 18d may be disposed on a surface of the area A2. Preferably, the transparent layer 18d is integrally formed with or made of the same material as the compensating lenses 18c.

Figure 9:
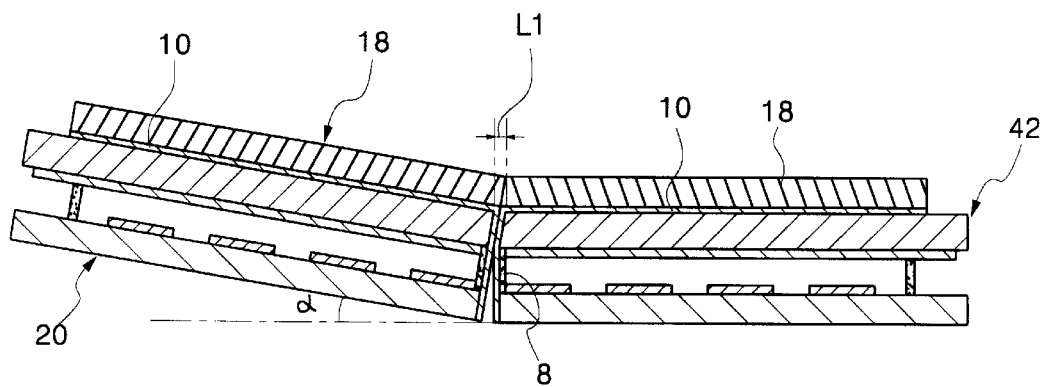
FIG. 9 is a sectional view of a multi-display device according to a third embodiment of the present invention.
Figure 10:
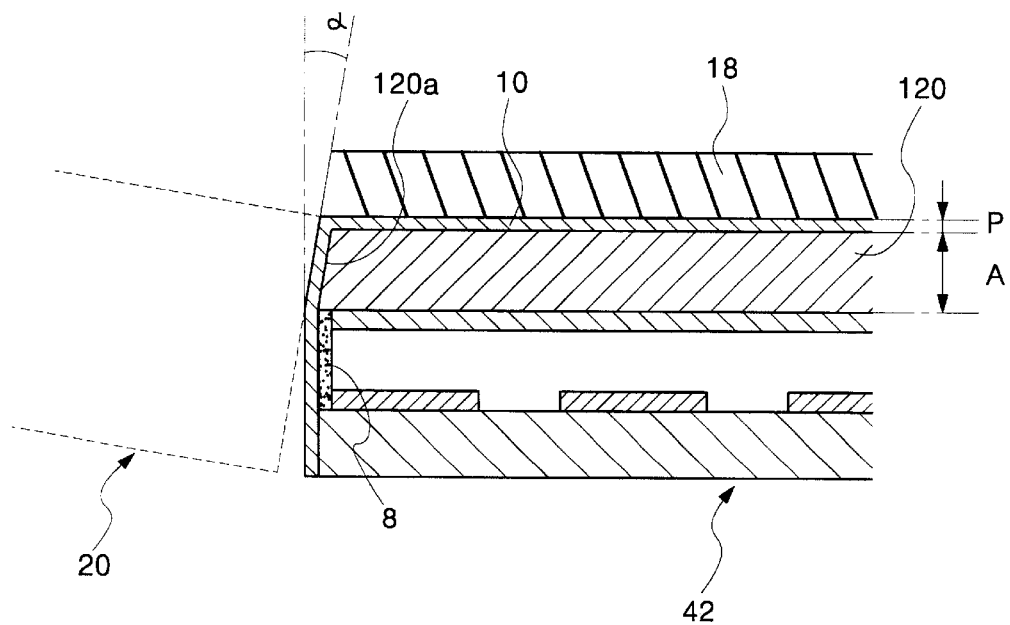
FIG. 10 is an enlarged sectional view of one of panels depicted in FIG. 9.
Figure 11:
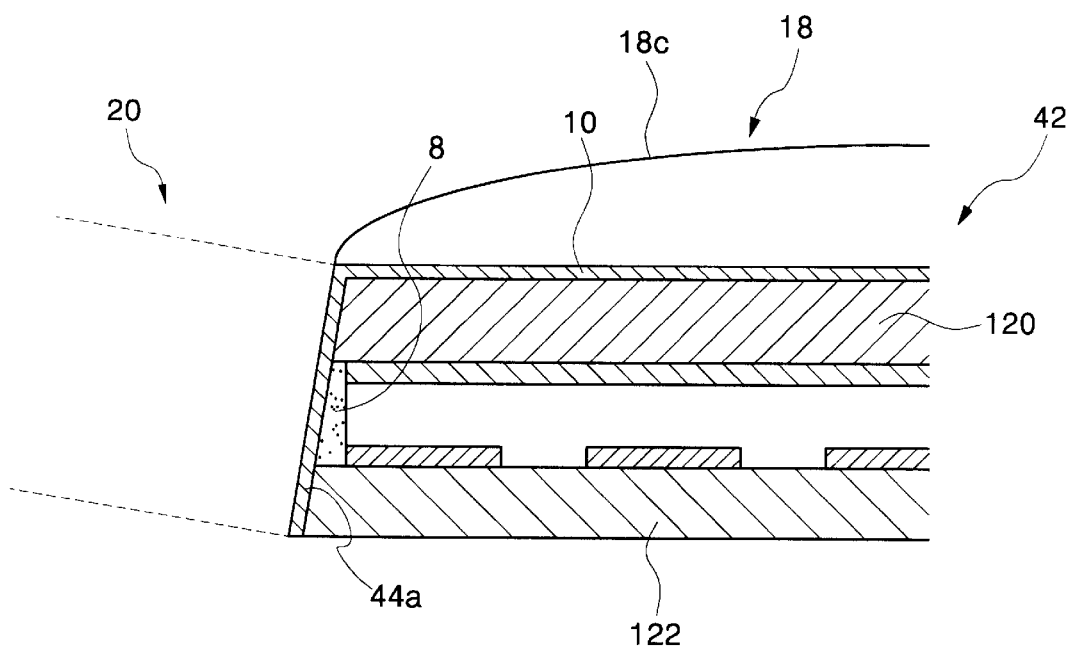
FIG. 11 is a sectional view of a modified example of the third embodiment.
Figure 12:
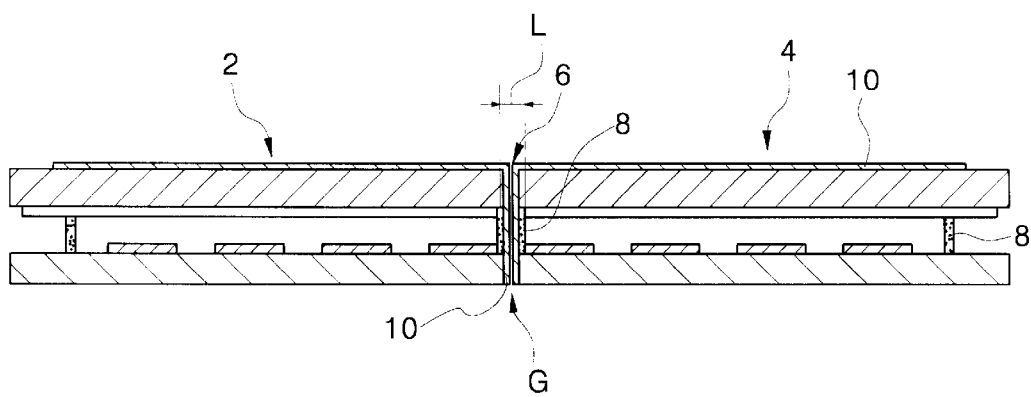
FIG. 12 is a sectional view of a conventional foldable flat display device.

FIGS. 9, 10 and 11 show a multi-display device according to a third embodiment of the present invention.

As shown in the drawings, the multi-display device of this embodiment is designed not to fully unfold. That is, to visually compensate for the separation of flat display panels 20 and 42 by closely abutting adjacent screen sides of the panels 20 and 42, the panel 20 is designed to be unfolded from the panel 42 with a predetermined angle α therebetween.

Protecting layers 10 may be attached on adjacent side walls and front surfaces of the flat display panels 20 and 42. Light compensating members 18 may be also disposed on the front surfaces of the flat display panels 20 and 42.

An angle of the flat display panel 20 with respect to a plane extending from a rear surface of the flat display panel 42 is preferably within a range of 1°–30°. If the angle is less than 1°, it is difficult to obtain a sufficient separation compensating effect, and if more than 30°, a different visual nature may exist.

To provide the predetermined angle between the flat display panels 20 and 42, as shown in FIG. 10, an adjacent side wall 120a of the front substrate 120 of the flat display panel 42 is designed to be inclined at the predetermined angle α with respect to an imaginary plane vertical to the screen surface of the flat display panel 42.

As a modified example of the third embodiment, one of the adjacent side walls of the panel 42 is designed to be inclined, while the adjacent side wall of the panel 20 is designed to be complemental to the inclination of the adjacent side wall of the panel 42 (see FIG. 11).

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A multi-display device comprising:

at least two flat display panels foldably joined to each other with a border defined therebetween; and light compensating means for directing light radiated from the panels toward an imaginary plane extending from a center line of the border of the flat display panels.

2. A multi-display device of claim 1, wherein the light compensating means comprises a plurality of inclined films disposed on the flat display panels and inclined toward the imaginary plane at a predetermined angle with respect to the screen surface of the flat display panels and a transparent member disposed between the inclined films.

3. A multi-display device of claim 2, wherein the predetermined angle of the inclined films is gradually increased as the inclined films are distanced from the boarder.

4. A multi-display device of claim 2, therein the inclined films are made of metal or resin.

5. A multi-display device of claim 2, wherein the transparent member is made of resin.

6. A multi-display device, comprising:

at least two flat display panels providing a plurality of screen surfaces, said display panels being foldably joined to each other with a border defined therebetween; and compensating lenses each disposed on only a portion of different corresponding ones of the screen surfaces of the flat display panels such that each of the compensating lenses can cover the border and at least a row of pixels which is adjacent to the border.

7. A multi-display device of claim 6, wherein each of the flat display panels is selected from the group consisting of a liquid crystal display (LCD), a field emission display (FED), a plasma display panel (PDP), and an electro luminescent display (EL).

8. A multi-display device of claim 6, further comprising a protecting film attached on screen surfaces and adjacent side walls of the flat display panels.

9. A multi-display device of claim 6, wherein a length L1 of the portion covered by the compensating lenses is set according to a following formula:

$$L1=L2/M$$

where L2 is a length of each pixel which is not covered by the compensating lenses and M is a magnifying force of the compensating lens.

10. A multi-display device of claim 6, further comprising transparent layers deposited on portions of the screen surfaces of the flat display panels not covered by the compensating lenses.

11. A multi-display device of claim 6, further comprising a diffuser disposed on the light compensating means.

12. A multi-display device of claim 6, wherein the flat display panels are fully unfolded, and an angle between screen surfaces of the panels is about 150°–179°.

13. A multi-display device of claim 6, wherein one of each pair of adjacent walls between neighboring pairs of the flat display panels is inclined at an angle of 1°–30° with respect to a plane vertical to the screen surface of the corresponding one of the neighboring pairs of the flat display panels.

14. The multi-display device of claim 6, comprised of one of said compensating lenses disposed to direct light emanating from a corresponding one of the screen surfaces toward an imaginary plane extending from a center line of the border of the corresponding one of the flat display panels.

15. A multi-display device, comprising:

a plurality of flat display panels providing a plurality of screen surfaces, said display panels being foldably joined to each other to form a border between each neighboring pair of said display panels;

a plurality of compensating lenses each deposited upon a different bordering portion of a corresponding one of said screen surfaces, each of the compensating lenses comprising less than an entirety of the corresponding screen surface of the display panels, with each of the compensating lenses simultaneously lying upon both one of said borders and a row of pixels adjacent to said one of said borders; and a plurality of transparent layers each covering a central portion of a different one of said screen surfaces not covered by said compensating lenses.

16. A multi-display device, comprising:

an array formed by a plurality of neighboring flat display panels, with each of said flat display panels each providing screen surface populated by a plurality of rows of pixels with each of said screen surfaces being separated from a neighboring one of said screen surfaces by a border; and a compensating lens deposited upon one of said screen surfaces to cover a corresponding one of said borders and one of said rows of pixels next adjacent to said corresponding one of said borders, and to direct light emanating from said one of said screen surfaces toward an imaginary plane extending transversely to said one of said screen surfaces from said corresponding one of said borders.

17. A multi-display device of claim 16, further comprising transparent layers deposited on portions of the screen surfaces of the flat display panels not covered by a compensating lenses.

18. A multi-display device of claim 16, wherein the flat display panels are fully unfolded, and an angle between screen surfaces of the panels is in a range of about 150°–179°.

19. A multi-display device of claim 16, wherein one of each pair of adjacent walls between neighboring pairs of the flat display panels is inclined at an angle of between approximately 1°–30° with respect to a plane vertical to the screen surface of one of the neighboring pairs of the flat display panels.

20. The multi-display device of claim 16, further comprised of said compensating lens covering a portion of said one of said screen surfaces set according the formula:

$$L1=L2/M$$

where L2 is a length of each pixel that is not covered by said compensating lens and M is a magnifying force of said compensating lens.

* * * * *